(12) United States Patent
Dobler

(10) Patent No.: US 7,857,524 B2  
(45) Date of Patent: Dec. 28, 2010

(54) PLUG FOR AN OPTICAL PLUG-IN CONNECTION

(75) Inventor: Oliver Dobler, Tschagguns (AT)

(73) Assignee: Neutrik Aktiengesellschaft, Schaan (LI)

( * ) Notice: Subject to any disclaimer, the term of this patent is extended or adjusted under 35 U.S.C. 154(b) by 0 days.

(21) Appl. No.: 12/500,746

(22) Filed: Jul. 10, 2009

(65) Prior Publication Data
US 2010/0014812 A1    Jan. 21, 2010

(30) Foreign Application Priority Data
Jul. 15, 2008    (DE) ........................ 10 2008 033 232

(51) Int. Cl.
*G02B 6/38*    (2006.01)
(52) U.S. Cl. ............... 385/69; 385/70; 385/75
(58) Field of Classification Search ............ 385/56, 385/58–60, 69–72, 75
See application file for complete search history.

(56) References Cited

U.S. PATENT DOCUMENTS

| | | |
|---|---|---|
| 6,004,147 A | 12/1999 | Don-Yehiya |
| 6,079,881 A | 6/2000 | Roth |
| 6,081,647 A | 6/2000 | Roth et al. |
| 6,340,246 B1 | 1/2002 | Yoshida et al. |
| 6,866,424 B2 | 3/2005 | Tanaka et al. |
| 7,144,163 B2 * | 12/2006 | Tanaka et al. ............... 385/75 |
| 7,153,041 B2 | 12/2006 | Mine et al. |
| 7,234,876 B2 * | 6/2007 | Ohtsu et al. ............... 385/59 |
| 7,284,912 B2 * | 10/2007 | Suzuki et al. ............... 385/75 |
| 7,559,700 B2 * | 7/2009 | Eguchi et al. ............... 385/70 |

FOREIGN PATENT DOCUMENTS

| | | |
|---|---|---|
| EP | 0893716 A1 | 1/1999 |
| EP | 0930521 A1 | 7/1999 |
| EP | 0977062 A2 | 2/2000 |
| EP | 1037078 A1 | 9/2000 |
| EP | 1271204 A1 | 1/2003 |
| EP | 1331499 A1 | 7/2003 |
| EP | 1 662 286 A | 5/2006 |
| EP | 1 936 415 A | 6/2008 |

OTHER PUBLICATIONS

Search Report of German priority application DE 10 2008 033 232 dated Jul. 15, 2008.
European Search Report from EP application 09 00 8787 dated Sep. 8, 2009.

* cited by examiner

*Primary Examiner*—Frank G Font
(74) *Attorney, Agent, or Firm*—Harris Beach PLLC; Neal L. Slifkin (57) ABSTRACT

Plug part (1, 2) for an optical plug connection for connecting optical waveguides (3) with one another, with the plug part (1, 2) having at least one pivotable closure flap (4) and a housing (5) and at least one optical waveguide (3) arranged inside the housing (5); and at least a sliding part (6) fitted on the housing (5), particularly inside the housing (5), displaceable especially linearly relative to the housing (5); with the sliding part (6) having at least one outlet (7) and the Plug part (1, 2) having at least one actuating element (8) to pivot the closure flap (4), with the actuating element (8) pivoting the closure flap (4) during the sliding of the sliding part (6); with the outlet (7) in the sliding part (6) closed, preferably completely, in at least one closed position of the closure flap (4) by the closure flap (4).

30 Claims, 7 Drawing Sheets

PLUG FOR AN OPTICAL PLUG-IN CONNECTION

CROSS-REFERENCE TO RELATED APPLICATIONS

This application claims priority to German Patent Application number 10 2008 033 232.1 filed Jul. 15, 2008, the disclosure of which is hereby incorporated by reference herein.

BACKGROUND OF THE INVENTION a) Field of the Invention

The invention relates to a plug-in part for an optical plug-in connection for connecting optical waveguides to one another; with the plug-in part having at least one pivotable closure flap and a housing and at least one optical waveguide arranged inside the housing; and a sliding part mounted on the housing, especially inside the housing, displaceable, particularly linearly, at least relative to the housing; with the sliding part having at least one outlet and the plug-in part having at least one actuating element to pivot the closure flap; with the actuating element pivoting the closure flap during the sliding of the sliding part.

b) Description of Related Prior Art

Plug-in parts of the type in question are known e.g., from DE 10 2004 025 512 A1. The plug-in parts can have one or more optical waveguides, with these optical waveguides of the plug-in connectors being connected by inserting the plug-in connectors into one another. From the document cited, the provision of closure flaps that are pivoted due to the sliding of the sliding parts is known, with these closure flaps closing the reception channels for the ferrules surrounding the optical waveguides. On the one hand, this has the disadvantage that each reception channel has to be provided with its own closure flap, which can be very costly for plug-in parts with several optical waveguides. Furthermore, plug-in parts of the type in question have the disadvantage that only the reception channels for the ferrules are covered and thus protected instead of the entire interior space of the housing.

BRIEF SUMMARY OF THE INVENTION

The aim of the invention is to propose an improvement. On the one hand, a closure option that is as simple as possible should be made available, preferably also for plug-in parts with several optical waveguides each. On the other hand, the entire interior space of the housing should be protected as much as possible against the entry of dirt and/or moisture.

According to the invention, the outlet in the sliding part is closed, preferably completely, by the closure flap in at least one closed position of the closure flap.

A basic idea of the invention is thus to attach the closure flap to the plug-in part so that this not only closes individual reception channels for optical waveguides, as known from prior art, but also closes the outlet in the sliding part itself. This results in the entire space behind it being protected. In an advantageous manner, a seal is provided between sliding part and closure flap which seals the closure flap in its closed position against the sliding part, thus ensuring a dust- and moisture-proof closure. The word "closed" however includes also the case in which the closure flap only covers the outlet, when a purely mechanical protection of the optical waveguides or the other components inside the housing is involved. Also the concept of the plug-in connection should be understood as being very general. What is involved here first of all is preferably a linear joining of two plug-in parts, with additional screw, rotary and other motions for connecting the plug-in parts being necessary or provided as needed. Understood by the term 'inside the housing' is that the respective component is located at least in part in an interior space surrounded by the housing. In that case, the sliding part displaceable relative to the housing can be arranged on the housing or especially inside the housing. It does not have to be mounted directly on the housing. This mounting can also occur by the insertion of other components.

In order to shield most of the interior space in the housing with the closure flap, the sliding part has a front face, which is arranged preferably, at least in the closed position of the closure flap, on an exterior side of the sliding part opposite the optical waveguide, and the outlet is an opening in the front face. This makes it possible to close the plug-in part with the closure flap as far ahead as possible. The front face is advantageously the surface, on which a force is exerted to displace the sliding part, e.g., through a second front face of a sliding part of another plug-in part. The front face is thus advantageously the part of the sliding part that is loaded with force during normal use in order to displace the sliding part.

The plug-in parts according to the invention can be used particularly to connect several optical waveguides of each plug-in part with one another through a single plug-in process. In that case, at least two, preferably at least three or at least four, optical waveguides are arranged inside the housing of each plug-in part. In the process optical waveguides are held, preferably together, in an optical waveguide support, which is arranged inside the housing, preferably not displaceable relative to the housing.

The outlet in the sliding part, preferably in its front face, is advantageously embodied to be so large that preferably all of the optical waveguides together arranged inside the housing of the plug-in part, preferably the optical waveguide support arranged inside the housing of the plug-in part, or the, preferably all of the, optical waveguides together of another plug-in part of the plug-in connection and/or an optical waveguide support of another plug-in part of the plug-in connection, in at least a position of the sliding part in which the closure flap releases the outlet, preferably completely, can be guided out through the outlet.

In terms of an automatic resetting of the sliding part after the application of force to the front face is discontinued, the plug-in part has at least one readjusting spring for the sliding part, against the exertion of force of which the sliding part can be displaced from its position in which the closure flap closes the outlet in the direction of the optical waveguide(s). The readjusting spring is advantageously supported on the housing or on an optical waveguide support in the housing. Furthermore, a flap readjusting spring is preferably provided. This acts upon the closure flap in the direction of its closed position so that the closure flap is returned to its closed position by the flap readjusting spring, preferably when or as soon as it encounters these forces acting upon it from without during the removal of pressure from the sliding parts. The readjusting spring for the sliding part and the flap readjusting spring for the closure flap can be a single spring. In the embodiment examples shown, however, there are two springs separate from one another. Naturally more than two springs are also possible, if this appears meaningful in a concrete embodiment variant. Furthermore it is also possible for the flap readjusting spring to serve as a pivot bearing for the flap or constitute this pivot bearing.

Plug-in connections or plug-in parts of the type in question frequently have at least rounded (when viewed sectionally in cross-section) particularly cylinder sleeve-shaped inner and/ or outer contours. In order to utilize the space inside the housing optimally, it is advantageous if the closure flap have an outer contour with a shape that is at least curved sectionally, preferably designed in the shape of a tubular section or a cylindrical section or a surface of a sphere. Thus the closure flap can be executed so large that it can close a relatively large outlet without using an excessive amount of space in the interior of the housing. The concept of tubular section involves curved areas that do not have to be circular, as is the case in cylindrical sections. Other curvatures deviating from a circular shape can be provided in the cross-section of the tubular sections.

Other features and details of preferred embodiment examples of the invention will be explained in the following using the Figures.

BRIEF DESCRIPTION OF THE SEVERAL VIEWS OF THE DRAWINGS

FIG. 11a to 22 representations of a male plug-in part of this optical plug-in connection designed according to the invention corresponding to this sleeve plug part;

DETAILED DESCRIPTION OF THE INVENTION

The inventive plug-in part 1 in FIGS. 1 to 10 involves a sleeve plug part or plug receptacle provided for mounting in a through-hole in a wall. It has a securing flange 27 arranged in the housing 5 for this, as is known from prior art. The sleeve plug part or plug receptacle is the plug-in part, in which or in whose housing the female optical waveguides or receiving sleeves are arranged for the male optical waveguides.

Figure 1:
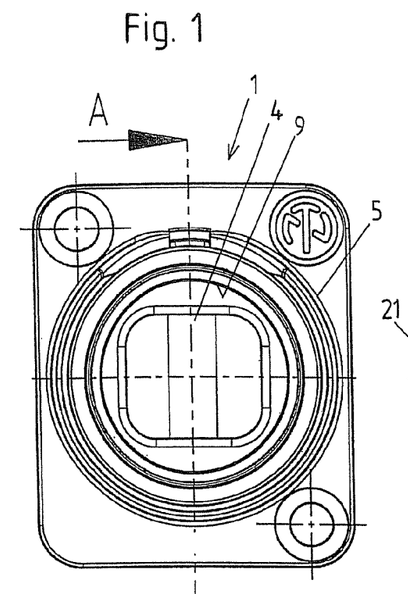
In FIG. 1 to 10 various representations of a plug-in part of an optical plug-in connection designed as a plug-in bushing according to the invention.
Figure 2:
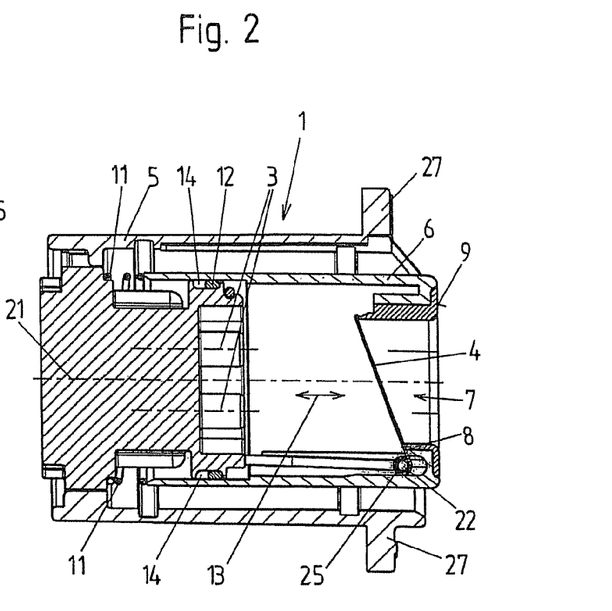
Figure 3:
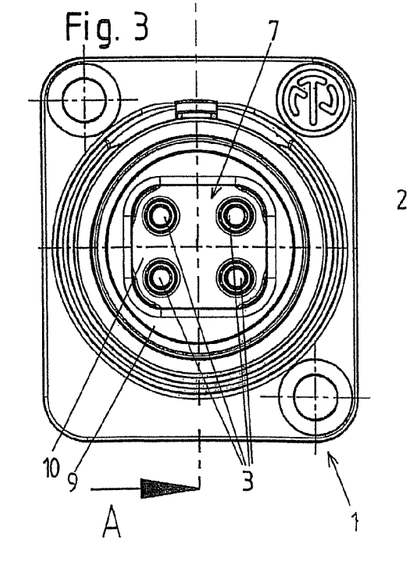

FIGS. 1 and 3 show views of this plug-in part, seen from the direction from which the corresponding male plug-in part or the insertion part is inserted. FIG. 1 shows the position in which the closure flap 4 closes the outlet 7 completely. FIG. 2 shows the longitudinal section in this position according to cutting line AA. FIG. 3 shows a plan view like FIG. 1; however the closure flap 4 is folded back here so that the outlet 7 is completely open and the four optical waveguides 3 arranged in this plug-in part can be seen. The securing and mounting of the optical waveguides 3 in the optical waveguide support 10 occur according to known manner. In the process the ferrules which receive the optical fibers 3 are usually arranged on their ends. The ferrules can be arranged so they are mobile or fixed in the optical waveguide support 10. The ferrules and the optical waveguide support can be embodied as known to prior art.

Figure 4:
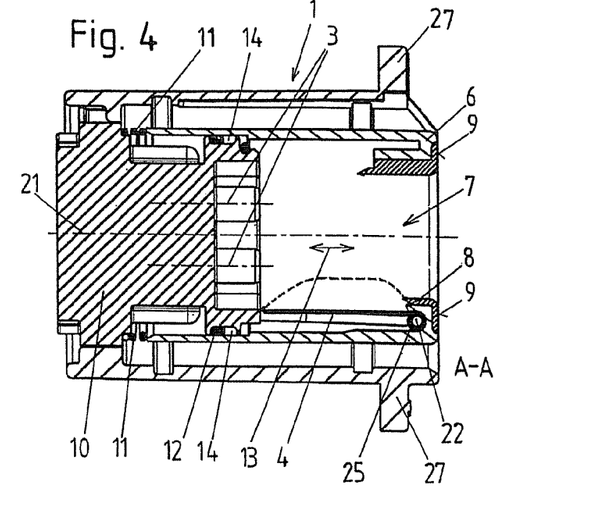
Figures 5, 6:
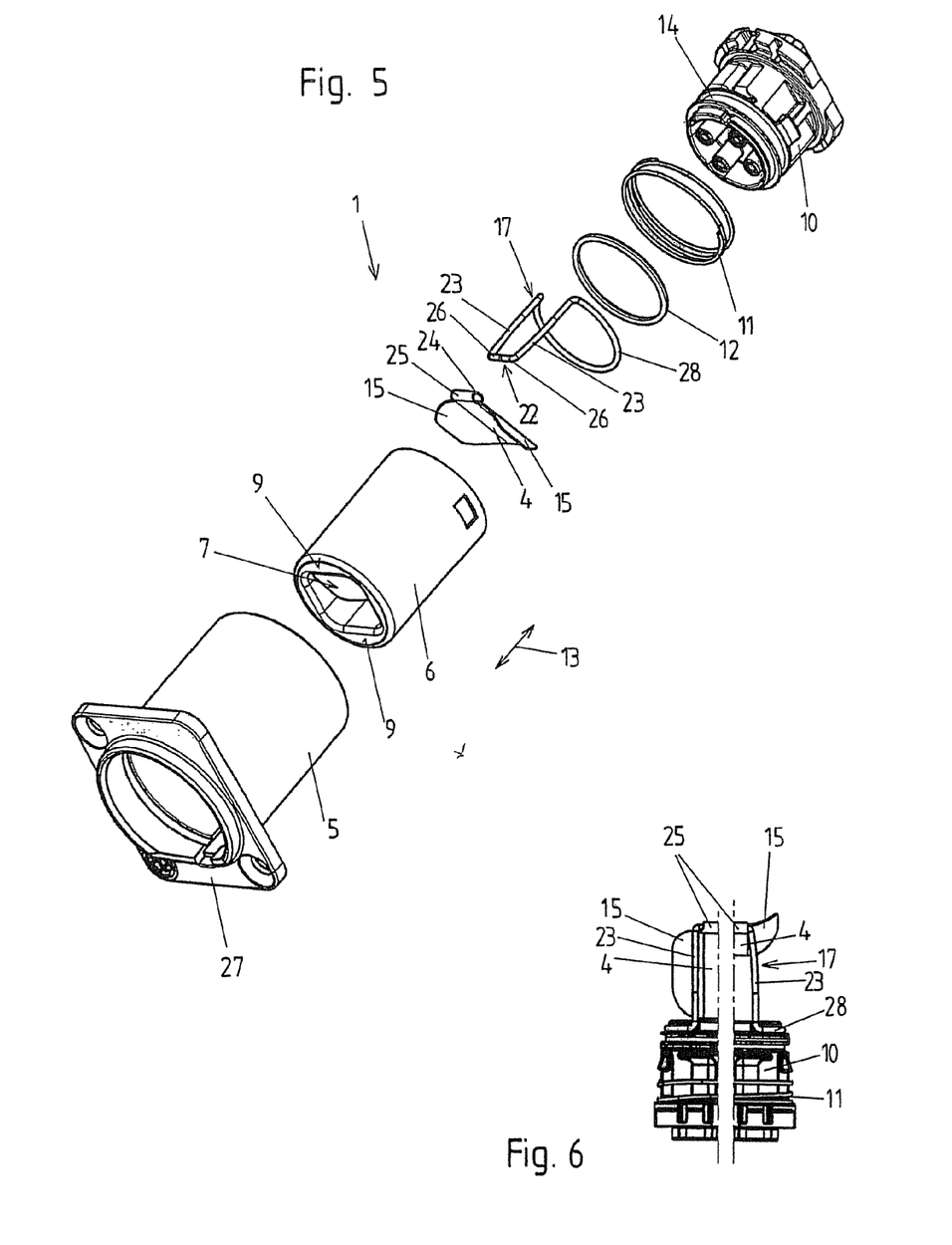
Figure 7:
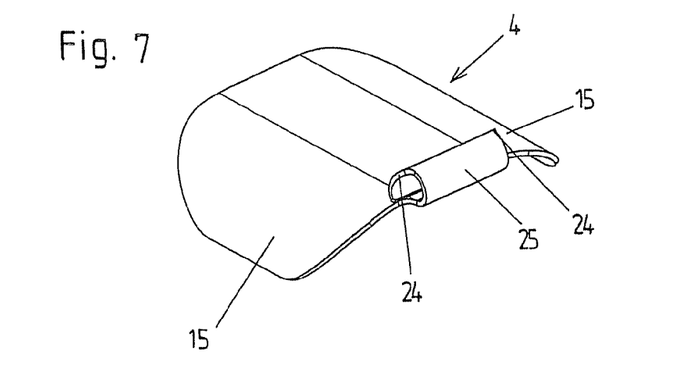
Figure 8:
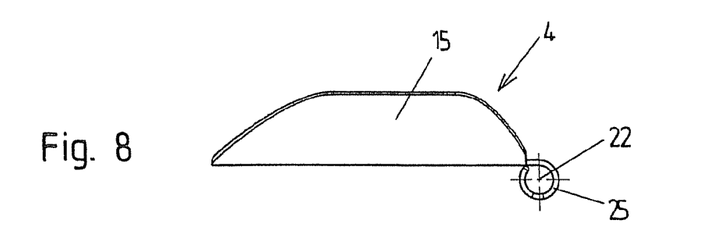
Figure 9:
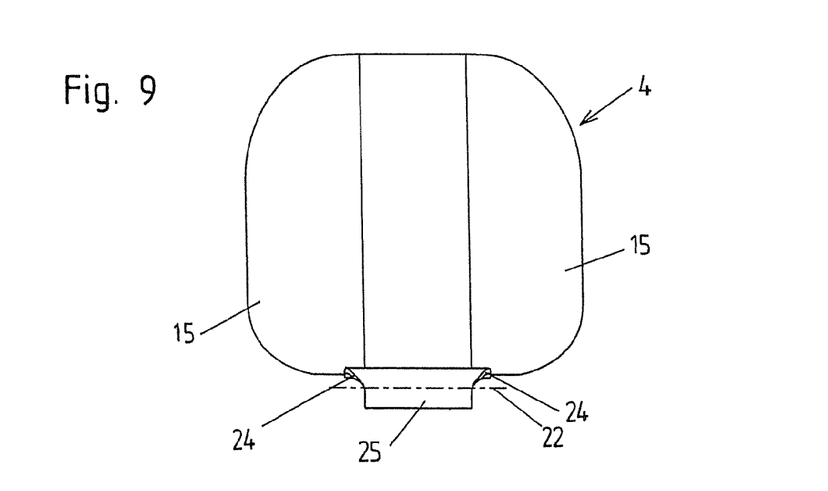
Figure 10:
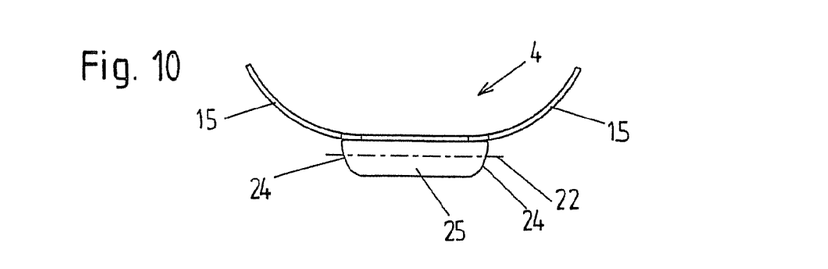

FIG. 4 shows a longitudinal section analogous to FIG. 2, however through the open position shown in FIG. 3 along cutting line AA. FIG. 5 shows the individual components of this plug-in part 1 in an exploded view. To explain the operation of the flap readjusting spring 17 of this embodiment example FIG. 6 shows the flap readjusting spring 17 of this embodiment example supported on and secured to the optical waveguide support 10, with the left half of this view showing the closure flap 4 in the completely opened position and the right portion of FIG. 6 showing the closure flap 4 in its closed position. The remaining components of this plug-in part 1 are partially omitted in this clear view of the arrangement. FIGS. 7 to 10 show additional, different views of the closure flap 4 of this embodiment example.

The more precise construction and operation of the plug-in part 1 is explained using the Figures just mentioned.

The sliding part 6 is displaceable linearly in this embodiment example, mounted along the displacement direction 13 inside the housing 5. The displacement directions 13 lie advantageously parallel to the longitudinal central axis 21 of the plug-in part 1 or of the housing 5. In the concrete embodiment example of the plug-in part 1 the sliding part 6 is mounted on the optical waveguide support 10 so that it is displaceable. The seal ring 12 is provided for sealing. This is arranged in a guide area 14 extended longitudinally parallel to the displacement direction 13 of the sliding part 6, designed here like a ring-shaped casing. Due to the longitudinal extension of this guide area 14 it is possible that the seal ring 12 may be displaced, e.g., by rolling in the guide area 14 in the respective displacement direction 13, in which the sliding part 6 is displaced directly opposite the optical waveguide support 10. Due to this particular rolling-sliding of the seal ring 12 the frictional forces are preferentially reduced. In addition, the wear is minimized so that a permanent, secure seal is ensured. Naturally such a seal ring maintained in a guide area 14 extended longitudinally can be used not just in the position or function visualized especially well in FIGS. 2 and 4. Instead it is also possible for this seal ring to be arranged or act between the sliding part 6 and the housing 5, or between the sliding part 6 and preferably another component of the plug-in part. Generally understood by "attached to the housing" is that between the component attached to the housing and the housing no relative motion takes place or can take place.

The readjusting spring 11 is provided to return the sliding part 6 from the position shown in FIG. 4 to the position shown in FIG. 2, which corresponds to the closed position of the closure flap 4. In the embodiment example actually shown of the plug-in part 1, this is supported on the optical waveguide support 10 and carries on its opposite side the end of the sliding part 6 facing away from the front face 9 and is pre-tensioned so that the sliding part 6 is pressed into the position shown in FIG. 2. What is actually involved here is a coil spring. Naturally other elastic bodies can also be used. Also it is not absolutely necessary to support the readjusting spring 11 on the optical waveguide support 10. A support can also occur instead directly on the housing 5 or to a connected component preferably attached to the housing. The application of force to slide the sliding part into the position shown in FIG. 4 occurs in this embodiment example via the front face 9, which projects from the housing 5. During an appropriate exertion of force the front face 9 and the sliding part 6 are displaced in the direction of the optical waveguides 3 or the optical waveguide support. As a result, the actuating element 8 arranged on the sliding part in this embodiment example presses on the outer contour of the closure flap 4 represented in FIG. 4 as a dotted line, whereby the closure flap is pivoted from the closed position shown in FIG. 2 into the completely open position shown in FIG. 4. The rotating axis 22, around which the closure flap 4 is pivoted in this embodiment example is part of the flap readjusting spring 17, which may be visualized especially well in the exploded view according to FIG. 5. In the embodiment example of the plug-in part 1 shown, this flap readjusting spring 17 has two spring-loaded limbs 23. These are pre-tensioned towards one another and act or press on two inclined surfaces 24 arranged opposite to one another in this embodiment example, which are provided on the closure flap 4. These inclined surfaces are arranged at an angle to one another varying from 0° to 180° relative to the spring-loaded limbs. Due to the spring-loading of the spring-loaded limbs 23 and their acting or pressing on the inclined surfaces 24 of the closure flap 4, these are pivoted around the rotating axis 22 into the direction of the closed position of the closure flap 4, provided they are not pressed by the actuating element 8 into the open position. The inclined surfaces 24 shown in the embodiment example are arranged in some areas on a tubular axis guide 25 of the closure flap 4, with the rotating axis 22 around which the closure flap 4 can be pivoted, mounted so as to be rotatable in this axis guide 25. This mounting may be seen especially well in FIG. 6. The mounting and embodiment of the inclined surfaces 24 are seen especially well in FIGS. 7, 9 and 10. The rotating axis 22 in the embodiment example shown is formed by two angled extensions 26 of the respective spring-loaded limbs 23, opposite the remaining spring-loaded limbs 23, and pointing at one another. Between the two extensions 26 a gap is provided so that the spring-loaded limbs 23 can be pressed apart by the inclined surfaces 24.

In the embodiment example shown the two spring-loaded limbs 23 of the flap readjusting spring 17 are integrally formed on a basic curve 28, which, on the one hand, acts to support and secure the flap readjusting spring 17—here on the optical waveguide support 10; on the other hand, they can also contribute to the pre-tensioning or spring action of the spring-loaded limbs 23. Naturally it is also possible to secure the spring-loaded limbs 23 to the optical waveguide support 10 or to other components that are connected with the housing 5 or to the housing 5 itself. Furthermore, it need not involve two spring-loaded limbs 23 pre-tensioned toward one another either. With inclined surfaces 24 arranged on the closure flap 4, these spring-loaded limbs 23 can also be pre-tensioned in a direction facing away from one another. It is also possible to embody a construction with only one spring-loaded limb 23 and only one inclined surface 24 as needed, with the opposite side of the mounting or the rotating axis 22 being embodied in a rigid manner. In this case the rotating axis 22 can also be formed at least in part by at least one angled extension 26 of the spring-loaded limb, preferably opposite the spring-loaded limb 23.

The various views of the closure flap 4 of this embodiment example, according to FIGS. 7 to 10, depict an enlargement of their components already mentioned. Particularly well visualized are the tubular sections 15 of the closure flap 4, which allow an optimal adaptation to the cylinder sleeve-shaped basic cut or cross-section of the housing 5 and thus a pivotal angle of the closure flap 4 that is as large as possible. As mentioned already, the axis guide 25 and the inclined surfaces 24 arranged on it are well visualized.

Figures 14A, 14B, 15A, 15B:
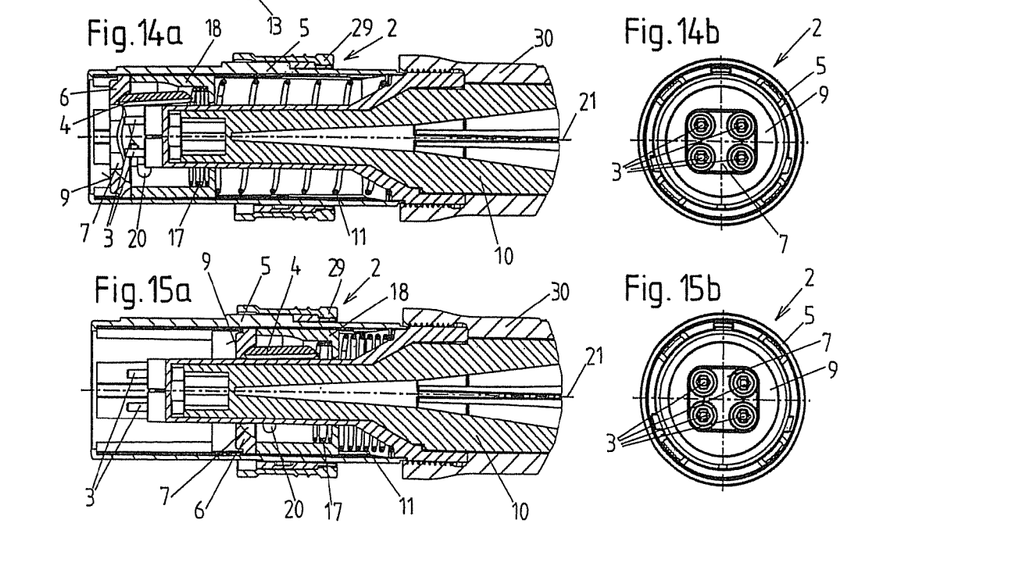
Figure 16:
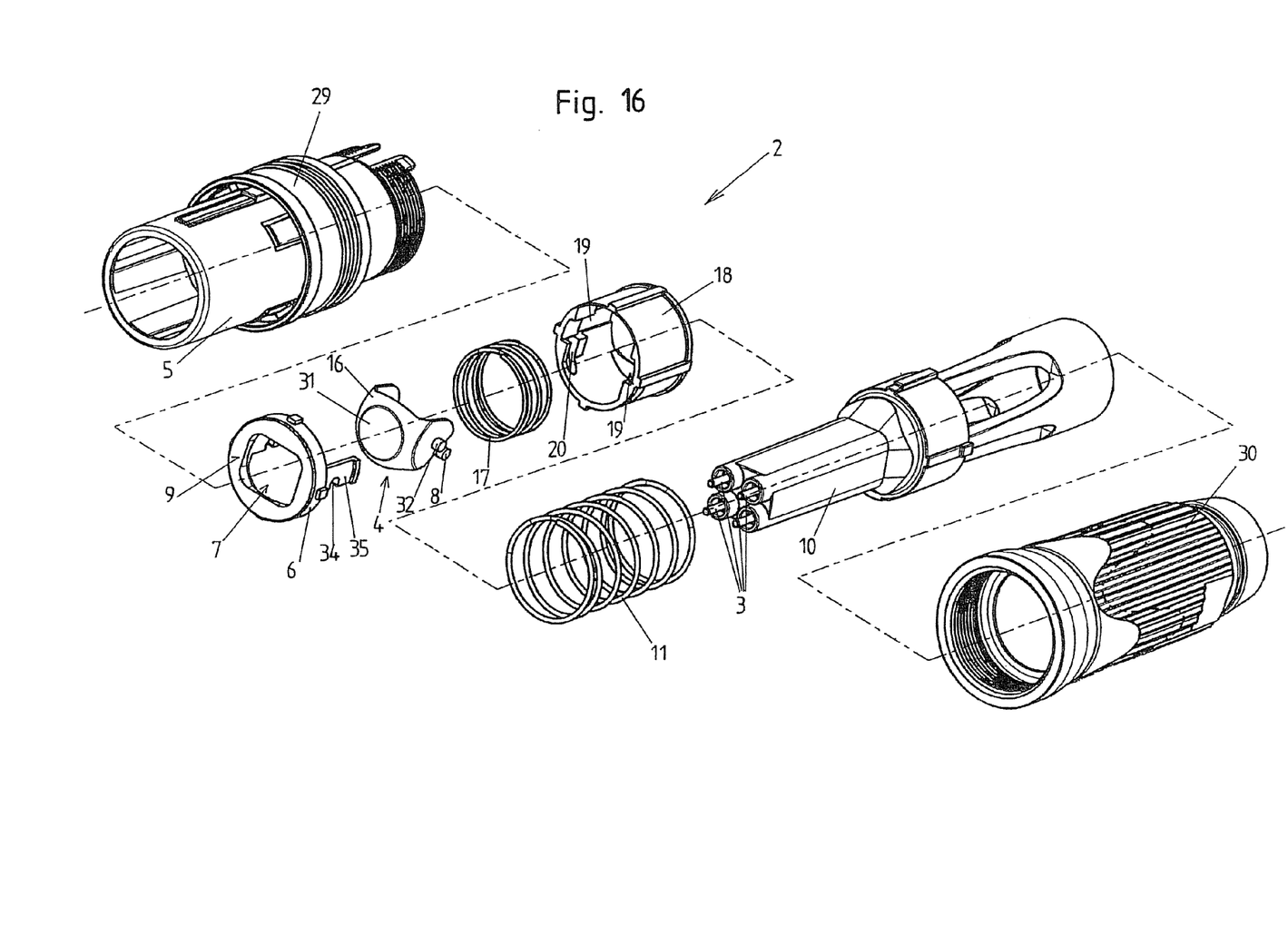
Figure 21:
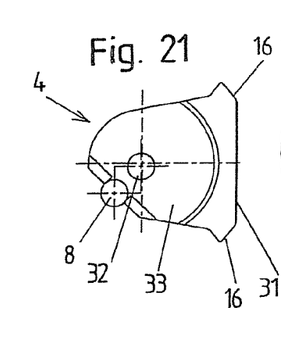
Figure 22:
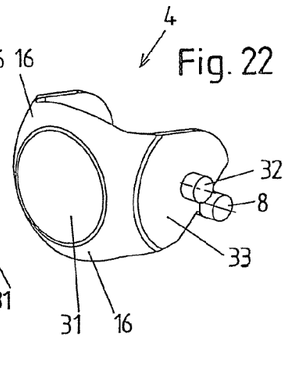

Using FIGS. 11a to 22, in the following the male plug-in part or insertion part 2 corresponding to plug-in part 1 embodied according to the first embodiment example is depicted now in the form of a plug-in bushing as a further embodiment example of the invention. This male plug-in part or insertion part 2 is that plug-in part, to which or in which or in whose housing the male or projecting optical waveguides 3 are arranged, which are inserted into the female receiving sleeves of the optical waveguides of the plug-in bushing 1. FIGS. 11a to 15a show longitudinal sections through this plug-in part 2, with the closed position of the closure flap 4 in FIG. 11a and the completely open position of the closure flap 4 in FIG. 15a or the completely pushed back position of the sliding part 6 being depicted. The position according to FIG. 15a is obtained if the male plug-in part 2 is inserted completely into the sleeve plug part 1. FIGS. 12a to 14a show various intermediate positions. FIGS. 11b to 15b show the respective views of the front side 9 of plug-in part 2, with especially good visualization of the degree of opening and the position of the closure flap in the each position shown. FIG. 16 shows once again an exploded view of this plug-in part 2. FIGS. 17 to 20 show various sections, each given in the individual Figures, through an arrangement of sliding part.6, an additional sliding part 18 and a closure flap 4 of plug-in part 2. FIGS. 21 and 22 show the closure flap 4 of this embodiment example. Also, if the individual components of the plug-in part 2 are shaped differently than the corresponding components of the previously described plug-in part 1, then the same terms and also the same reference numbers were selected for components having the same function.

The following description of this embodiment example concentrates on the differences from the first embodiment example.

An initial important difference is constituted by the additional sliding part 18 on the housing—here inside the housing 5, which is displaceable linearly relative to the housing and is displaceable linearly relative to the sliding part 6. To displace the sliding part 6 against the additional sliding part 18 two opposing guide grooves 19 are provided in the embodiment example shown in the latter, in which the additional sliding part 18 or its arms 35 are guided during displacement. The flap readjusting spring 17, which in this embodiment example is embodied as a coil spring, acts between the sliding part 6 and the additional sliding part 18. Naturally every elastic element that is shaped differently and is suitable can also be used here. The sliding part 6 is loaded or pre-tensioned by the flap readjusting spring 17 in a direction away from the additional sliding part 18. Due to this pre-tensioning the flap readjusting spring 17 also acts on the closure flap 4, as explained in the following. The closure flap 4 in this embodiment example is rotatable on the sliding part 6 and is mounted here so that it is displaceable linearly in an additional guide groove 20 on or in the additional sliding part 18 as well. In the embodiment example actually shown a couple of opposing spindles 32 arranged on the closure flap limbs 33 or on the closure flap 4 are indicated for the rotatable mounting of the closure flap 4 in the sliding part 6, through which the rotating axis 22 runs. In this embodiment example the spindles 32 each grip the spindle sockets 34 in the arms 35 of the sliding parts. This can be viewed especially well in FIG. 19. In addition to the rotating axis 22 function, the spindles 32 and the spindle socket 34 also see to it that the closure flap 4 together with the sliding part 6 are displaced—linearly in the embodiment example shown. To achieve a pivoting of the closure flap 4 during this displacement, an actuating element 8 is also provided in this embodiment example. In the actually embodied example this is achieved through the pin-shaped actuating elements 8, visualized particularly well in FIGS. 16 and 17 to 19 as well as in 21 and 22. The actual embodiment example involves two pins arranged on opposite closure flap limbs 33 or pointing outwards. Naturally one pin would also suffice as the actuating element 8. The actuating elements 8 of this embodiment example are mounted in the additional guide grooves 8 in the additional sliding part 18 and are displaceable. Also involved here is a linearly displaceable mounting, which need not be that way. The guide groove 19, along which the sliding part 6 can be displaced against the additional sliding part 18, is arranged orthogonally to the additional guide groove 8 in the embodiment example actually shown. This also need not be that way. Another angled arrangement, thus not parallel, of these two guide grooves 19 to 20 is also possible. If the sliding part 6 is displaced now in the direction of the additional sliding part 18, while pressure is being exerted on the front face 9 of the sliding part 6, then the spindles 32 together with the sliding part 6 or its arms 35 are displaced into the guide groove 19 and the actuating elements 8 cannot execute a displacement in this direction. They are displaced into the additional guide groove 20, which leads to a pivoting of the closure flap 4. The resetting and thus also the pivoting of the closure flap 4 into the closed position according to FIGS. 11a and 11b and FIG. 20 occurs through an elastic extension of the flap readjusting spring 17 pre-tensioned in this direction as soon as no corresponding counterforce acts on the front face 9 of the sliding part 6.

Figure 11A:
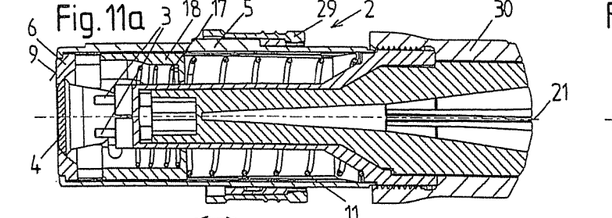
Figure 11B:
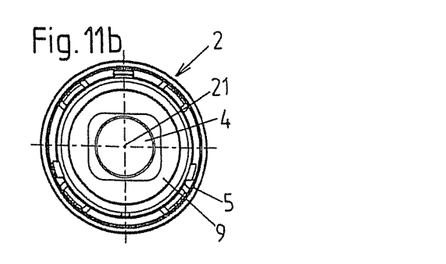
Figure 12A:
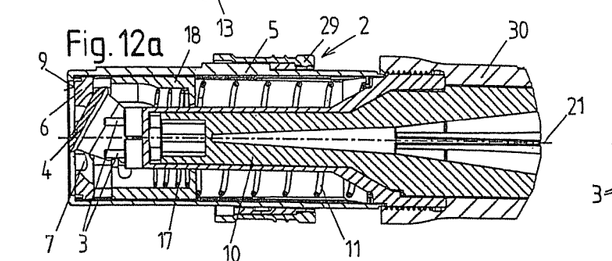
Figure 12B:
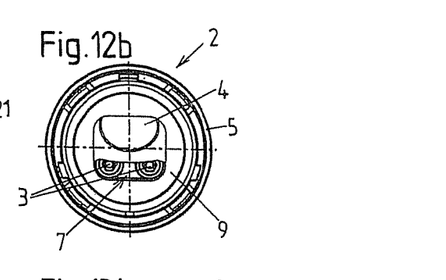
Figure 13A:
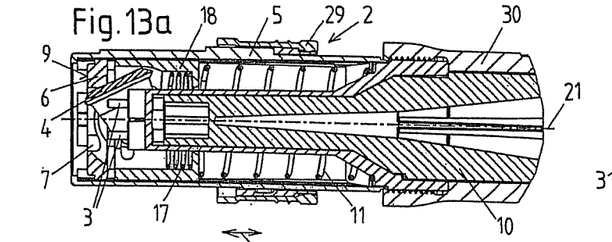
Figure 13B:
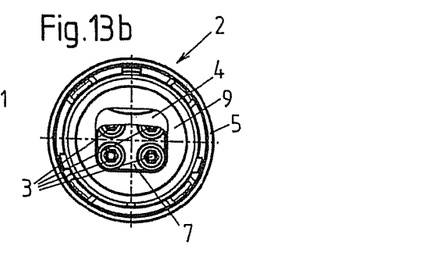

As can be seen from FIGS. 14a and 15a, during the corresponding application of force to the front face 9, however, not just a relative displacement between sliding part 6 and additional sliding part 18 occurs. Instead these two components are pushed together into the housing interior. This occurs by compressing the readjusting spring 11, which is also supported on the optical waveguide support 10 in this embodiment example, which, however, as explained already with regard to plug-in part 1, is not the only possible embodiment variant. During the sliding of the sliding part 6 and the additional sliding part 18, the optical waveguide 3 and part of the optical waveguide support 10 enter through the already open outlet 7, which allows the optical waveguide 3 of the plug-in part 2 to connect with the optical waveguides 3 arranged in the plug-in part 1, as explained further below. If the application of force or the corresponding pressure on the front face 9 of the sliding part 6 is omitted, then the readjusting spring 11 ensures that the additional sliding part 18 together with the sliding part 6 are pushed back into the position shown in FIG. 14a. As shown in FIG. 11a, the flap readjusting spring 17 ensures the resetting continues into the closed position of the closure flap 4, in which the sliding part 6 is arranged at a distance from the additional sliding part 18 in the direction of displacement 13 or the direction of the longitudinal central axis 21, also running parallel to it here. In order to carry out first the opening of the closure flap 4 or the pivoting and then the displacement of the sliding part together with the additional sliding part, when opening from the position shown in FIG. 11a into the position shown in FIG. 15a, the flap readjusting spring 17 is advantageously deformable with weaker or with less force than the readjusting spring 11. This applies preferably in general and in particular also to the plug-in part 1 of the first embodiment example.

As may be seen particularly in FIGS. 21 and 22, the closure flap 4 has rounded areas for the reasons already mentioned. In the embodiment example shown it involves sections of the surface of a sphere 16. So the closure flap 4 in the closed position according to FIG. 11a and FIG. 20 does not protrude over the sliding part 6; it has a flattened area 31 centrally.

Figure 17:
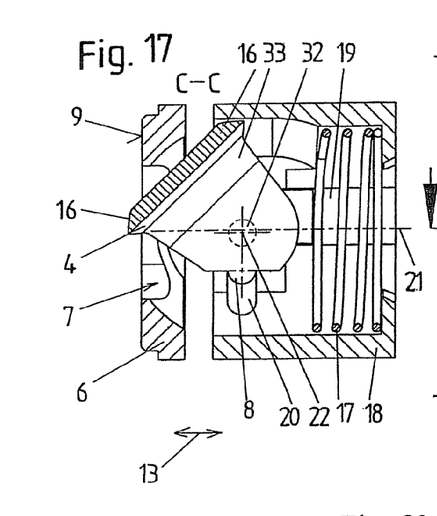
Figure 18:
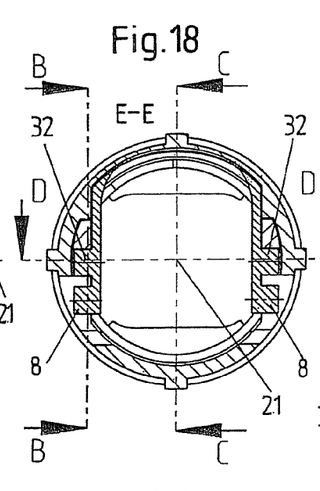
Figure 19:
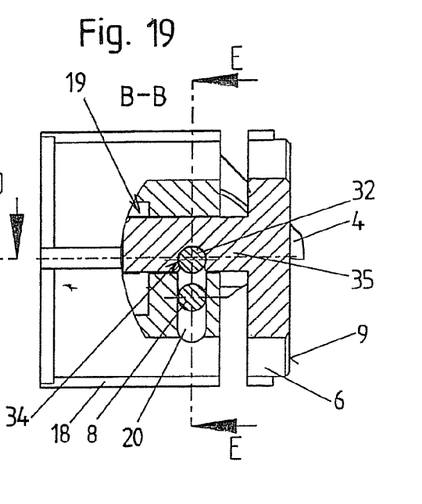
Figure 20:
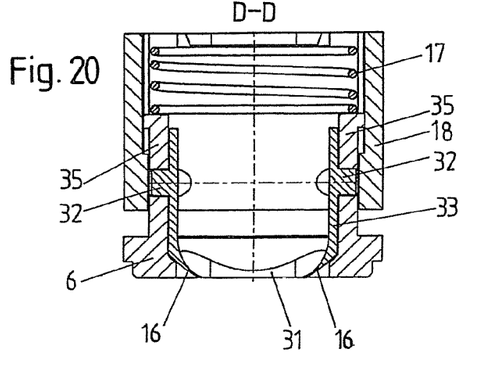

As may be seen in the actual embodiment example, particularly in FIGS. 17 to 19, the rotating axis 22 of the closure flap 4 defined by the spindles 32 lies relatively close to the longitudinal central axis 21 here, particularly in the closed position of the closure flap 4, but also in all other positions. Thus it forms the center point of the sections of the surface of a sphere 16, which leads to a pivoting of the closure flap 4, which optimizes space. Advantageously, the distance between the longitudinal central axis 21 of the housing 5 or of the sliding part 6 and the rotating axis 22, around which the closure flap 4 can pivot, amounts to less than 10%, preferably less than 5%, of the maximum outer diameter of the sliding part. Naturally the longitudinal central axis 21 and, in the most cases, also the rotating axis 22 do not involve physically present, continuous axes. Their positions however are easily determined with drawings, as shown in FIGS. 17 to 19. The distance then is the smallest distance between the longitudinal central axis 21 and the rotating axis 22. As this embodiment example shows, the rotating axis 22, around which the closure flap 4 can pivot, is arranged eccentrically with regard to a longitudinal central axis 21 of the housing 5 or the sliding part 6. Eccentric means that the rotating axis 22 does not cross the longitudinal central axis 21, but instead is arranged at a preferably short distance from it. Due to this eccentricity, already at the start of the pivotal motion from the closed position according to FIG. 11a, the closure flap 4 can be easily lifted from its seat in the sliding part 6. On the one hand, this prevents damage to a seal arranged as needed between the closure flap 4 and the sliding part 6. On the other hand, it prevents the closure flap 4, while pivoting, from scraping along the seat of the sliding part 6 holding it. All of this is advantageous in terms of a long service life for the plug-in part. Furthermore, due to the eccentric position of the rotating axis mentioned, the frictional forces and thus the opening forces become smaller, after just a short pivotal motion.

The housing front end closure 30 still needs mentioning. As in the embodiment example of the plug-in part 2 shown, it can be screwed onto its housing 5. This is advantageous in terms of a simple assembly of the plug-in part 2, but is also not absolutely necessary. The housing 5 can also have a single-element end.

Furthermore, a locking sleeve 29 is also provided on the plug-in part 2 in the known manner. This serves to lock plug-in part 2 into plug-in part 1, when they are completely inserted into one another, and thus are connected, in order to avoid an unwanted loosening of this connection. As known from prior art, the locking sleeve 29 and its locking onto plug-in part 1 can be embodied so that additional explanations about it become superfluous.

Figure 23:
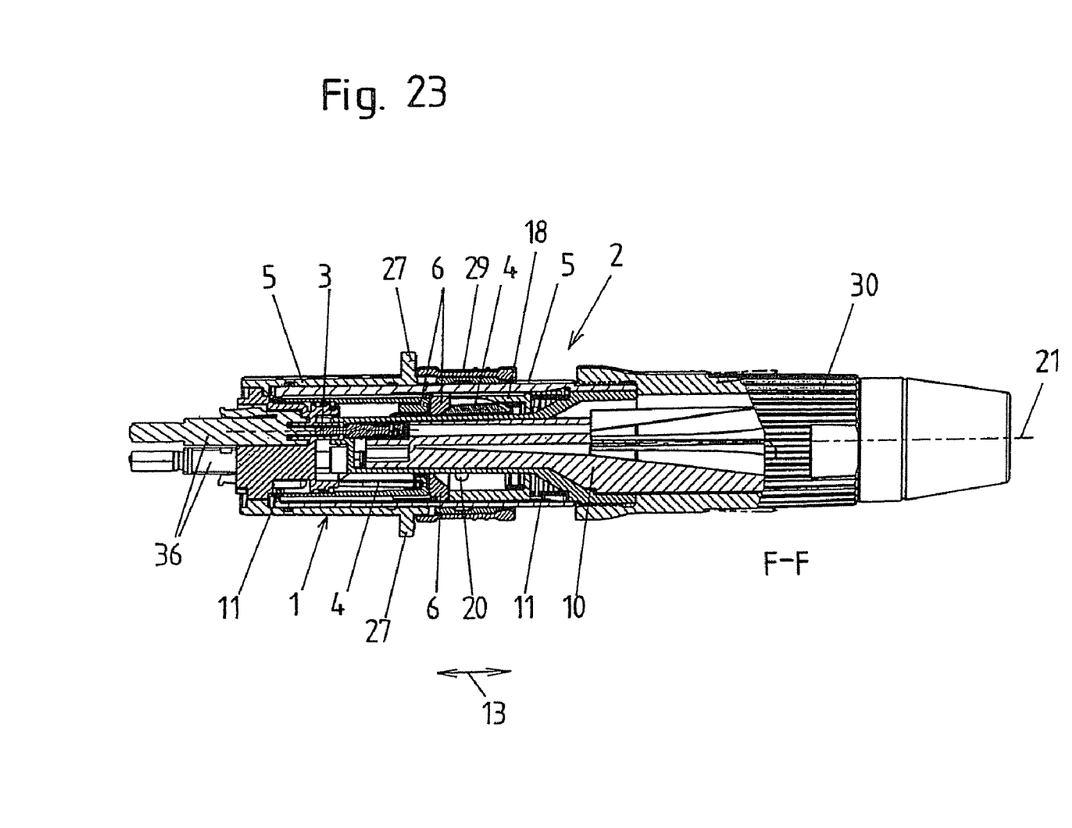
FIG. 23 and 24 representations of this plug-in connection, if the male plug-in part is inserted completely into the sleeve plug part.
Figure 24:
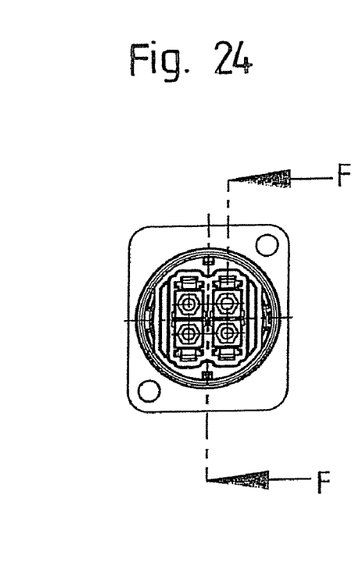

Now FIG. 23 shows a partial section representation of the plug-in parts 1 and 2, completely connected with one another. In this position the respective optical waveguides 3 of the two plug-in parts are connected with one another so that light signals can be transmitted. FIG. 24 shows the cutting line FF of FIG. 23. In the represented, contacted position the two front faces 9 of the respective sliding parts 6 lie against one another. The respective closure flaps 4 are completely open; the sliding parts 6 are each inserted to the maximum in the respective housing 5; the optical waveguide support 10 of the male plug-in part 2 together with its optical waveguides has penetrated the outlets 7 in both sliding parts 6 so that the optical waveguides 3 of these two plug-in parts 1 and 2 can be brought into contact across from one another in the known manner. In the embodiment example actually depicted, on the opposite side of plug-in part 2, known cable plugs 36 (e.g., shown in DE 10 2004 025 512 A1) are inserted into plug-in part 1, which forms the optical waveguides 3 of plug-in part 1. This does not necessarily have to be the case. The optical waveguides 3 of plug-in part 1 can also be fixed in it.

To remove plug-in part 2 from plug-in part 1 the locking sleeve 29 must be actuated accordingly so that the connection given by them between the two plug-in parts is released. Then plug-in part 2 can be pulled out of plug-in part 1, whereby the sliding parts 6 and the respective closure flaps 4 can be reset by the respective flap readjusting springs 17 and the readjusting springs 11 in their closed positions according to FIG. 11a and FIGS. 1 and 2. Upon reinsertion of plug-in part 2 in plug-in part 1 the two front faces 9 of the sliding parts 6 are in contact, whereby these are displaced once again and the closure flaps 4 opened automatically, whereby the connected position shown in FIG. 23 is attained once again by further insertion of plug-in part 2 into plug-in part 1.

PARTS LIST

1 Plug-in part 23 Spring-loaded limb
2 Plug-in part 24 Inclined surface
3 Optical waveguide 25 Axis guide 4 Closure flap
5 Housing
6 Sliding part
7 Outlet
8 Actuating element
9 Front face
10 Optical waveguide support
11 Readjusting spring
12 Seal ring
13 Displacement direction
14 Guide area
15 Tubular section
16 Section of the surface of a sphere
17 Flap readjusting spring
18 Additional sliding part
19 Guide groove
20 Additional guide groove
21 Longitudinal central axis
22 Rotating axis
23 Spring-loaded limb
24 Inclined surface
25 Axis guide
26 Extension
27 Securing flange
28 Basic curve
29 Locking sleeve
30 Housing end
31 Flattening
32 Spindles
33 Closure flap limb
34 Spindle socket
35 Arm
36 Cable plug

The invention claimed is:

1. A plug-in part for an optical plug-in connection for connecting optical waveguides with one another, comprising:
   a) a pivotable closure flap;
   b) a housing supportive of said pivotable closure flap;
   c) an optical wave guide arranged inside said housing; and
   d) a sliding part displaceable relative to said housing,
   wherein said sliding part has an outlet, and
   wherein said plug-in part has an actuating element for pivoting said closure flap during sliding of said sliding part, and
   wherein said sliding part is closed by said closure flap in a closed position of said closure flap; and
   e) a seal ring arranged between said sliding part and one of said housing and another component of said plug-in part, said seal ring being arranged in a longitudinal guide area parallel to a displacement direction of said sliding part.

2. A plug-in part according to claim 1, wherein said other component of said plug-in part is an optical waveguide support.

3. A plug-in part according to claim 1, wherein said guide area is a ring-shaped casing.

4. A plug-in part according to claim 1, wherein said seal ring is displaceable in said displacement direction.

5. A plug-in part according to claim 4, wherein said seal ring is displaceable by rolling in said displacement direction.

6. A plug-in part for an optical plug-in connection for connecting optical waveguides with one another, comprising:
   a) a pivotable closure flap;
   b) a housing supportive of said pivotable closure flap;
   c) an optical wave guide arranged inside said housing; and
   d) a sliding part displaceable relative to said housing,
   wherein said sliding part has an outlet, and
   e) an actuating element for pivoting said closure flap during sliding of said sliding part,
   wherein said sliding part is closed by said closure flap in a closed position of said closure flap, and
   wherein the surface of said closure flap has a contour selected from the group consisting of a section of a ring-shaped casing, a section of a cylinder sleeve, and a surface of a sphere.

7. A plug-in part according to claim 6, wherein said sliding part comprises a front face that in said closed position of said closure flap is arranged on an exterior side of said sliding part opposite said optical waveguide, said outlet being an opening in said front face.

8. A plug-in part according to claim 6, having a plurality of said optical waveguides arranged inside said housing.

9. A plug-in part according to claim 8, wherein said plurality of optical waveguides is held in an optical waveguide support is arranged inside said housing.

10. A plug-in part according to claim 9, wherein said optical waveguide support is fixed inside said housing.

11. A plug-in part according to claim 8, wherein either of one of said optical waveguides of said plug-in part, and optical waveguides of another plug-in part is guidable through said outlet.

12. A plug-in part according to claim 6 comprising a readjusting spring operative against said sliding part to displace said sliding part in the direction of said optical waveguide.

13. A plug-in part according to claim 12, wherein said readjusting spring is supported on one of said housing and an optical waveguide support.

14. A plug-in part according to claim 6, provided with a flap readjusting spring that acts upon said closure flap in a closure direction thereof.

15. A plug-in part according to claim 6, wherein said sliding part is a first sliding part, comprising a second sliding part mounted to said housing and displaceable relative to said housing and to said first sliding part.

16. A plug-in part according to claim 6 wherein the distance between a longitudinal central axis of the of said housing and a rotating axis is less than 10% of the maximum outer diameter of said sliding part.

17. A plug-in part according to claim 6 wherein a rotating axis is arranged eccentrically in relation to a longitudinal central axis of said housing.

18. A plug-in part for an optical plug-in connection for connecting optical waveguides with one another, comprising:
   a) a pivotable closure flap;
   b) a housing supportive of said pivotable closure flap;
   c) an optical wave guide arranged inside said housing; and
   d) a first sliding part displaceable relative to said housing,
   wherein said sliding part has an outlet, and
   wherein said plug-in part has an actuating element for pivoting said closure flap during sliding of said sliding part, and
   wherein said sliding part is closed by said closure flap in a closed position of said closure flap, and
   wherein said closure flap has a contour selected from the group consisting of a section of a ring-shaped casing, a section of a cylinder sleeve, and a surface of a sphere, and
   e) a flap readjusting spring operational between said first sliding part and a second sliding part.

19. A plug-in part according to claim 18, wherein said flap readjusting spring is operational to load said first sliding part in the direction away from said second sliding part.

20. A plug-in part according to claim 17, wherein said second sliding part is displaceable linearly relative to said housing.

21. A plug-in part according to claim 17, wherein said first sliding part is displaceable linearly relative to said second sliding part.

22. A plug-in part according to claim 17, wherein said first sliding part is mounted in a guide groove in said second sliding part.

23. A plug-in part according to claim 17, wherein said closure flap is mounted on said second sliding part.

24. A plug-in part according to claim 23, wherein said closure flap is mounted in one of an additional guide groove said second sliding part.

25. A plug-in part for an optical plug-in connection for connecting optical waveguides with one another, comprising:
   a) a pivotable closure flap having an inclined surface;
   b) a housing supportive of said pivotable closure flap;
   c) an optical wave guide arranged inside said housing; and
   d) a sliding part displaceable relative to said housing,
   wherein said sliding part has an outlet, and
   wherein said plug-in part has an actuating element for pivoting said closure flap during sliding of said sliding part, and
   wherein said sliding part is closed by said closure flap in a closed position of said closure flap; and
   e) a flap readjusting spring having first and second spring-loaded limbs pre-tensioned with respect to one another and engageable with said inclined surface of said pivotable closure flap.

26. A plug-in part according to claim 25, wherein said closure flap is arranged between said first and second spring-loaded limbs.

27. A plug-in part according to claim 25, wherein said inclined surface is rotatable on a partially tubular axis guide of said closure flap.

28. A plug-in part according to claim 25, wherein said sliding part is displaceable linearly relative to said housing.

29. A plug-in part according to claim 25, wherein said outlet is completely closeable by said closure flap.

30. A plug-in connection comprising a plug-in part including,
   a) a pivotable closure flap;
   b) a housing supportive of said pivotable closure flap;
   c) an optical wave guide arranged inside said housing; and
   d) a sliding part displaceable relative to said housing and having an outlet, and
   e) an actuating element for pivoting said closure flap during sliding of said sliding part,
   wherein said sliding part is closed by said closure flap, and
   wherein said closure flap has a contour selected from the group consisting of a section of a ring-shaped casing, a section of a cylinder sleeve, and a surface of a sphere.

* * * * *